United States Patent [19]

Delano

[11] Patent Number: 5,125,679
[45] Date of Patent: Jun. 30, 1992

[54] TRUCK-TRAILER CONNECTION WITH MEANS TO ASSIST COUPLING/UNCOUPLING

[76] Inventor: Charles G. Delano, 6449 Long Meadow, Corpus Christi, Tex. 78413

[21] Appl. No.: 418,344

[22] Filed: Sep. 28, 1989

[51] Int. Cl.⁵ ............................................. B60D 1/40
[52] U.S. Cl. .......................... 280/425.2; 280/423.1;
280/475; 280/477; 280/479.1; 248/293;
248/352
[58] Field of Search ............... 280/475, 407.1, 425.2,
280/477, 414.5, 417.1, 425.1, 441.2, 476.1,
478.1, 479.1, 490.1, 423.1, 508, 901, 479.3, 429,
430; 248/352, 293

[56] References Cited

U.S. PATENT DOCUMENTS

| Re. 19,451 | 2/1935 | Molinare | 280/430 |
|---|---|---|---|
| 2,104,734 | 1/1938 | Carpenter | 280/475 |
| 2,475,443 | 7/1949 | Bill | 280/423.1 |
| 2,663,574 | 12/1953 | Martin | 280/417.1 |
| 2,854,148 | 9/1958 | Mattos et al. | 248/293 |
| 2,864,627 | 12/1958 | Kleinknecht | 280/423.1 |
| 3,084,953 | 4/1963 | McGregor | 280/477 |
| 4,168,847 | 9/1979 | Westphal | 280/423.1 |
| 4,283,073 | 8/1981 | Gostomski et al. | 280/508 |
| 4,472,100 | 9/1984 | Wagner | 280/441.2 |
| 4,669,748 | 6/1987 | LeVee | 280/423.1 |

FOREIGN PATENT DOCUMENTS 0968111 11/1950 France ..................... 248/293

Primary Examiner—Charles A. Marmor
Assistant Examiner—A. M. Boehler
Attorney, Agent, or Firm—G. Turner Moller

[57] ABSTRACT

A goose neck trailer includes a ball receiver and an adjacent hydraulic ram having a caster wheel on the lower end thereof. A trailer stand is provided to hold the goose neck off the ground when the trailer is parked. A truck is provided with guide rails directing the trailer caster wheel to a position to locate the ball receiver immediately above the trailer ball. The hydraulic ram is manipulated to transfer the load of the trailer between the ground and the truck at various times in coupling and uncoupling the truck and trailer.

14 Claims, 2 Drawing Sheets

FIG. 1
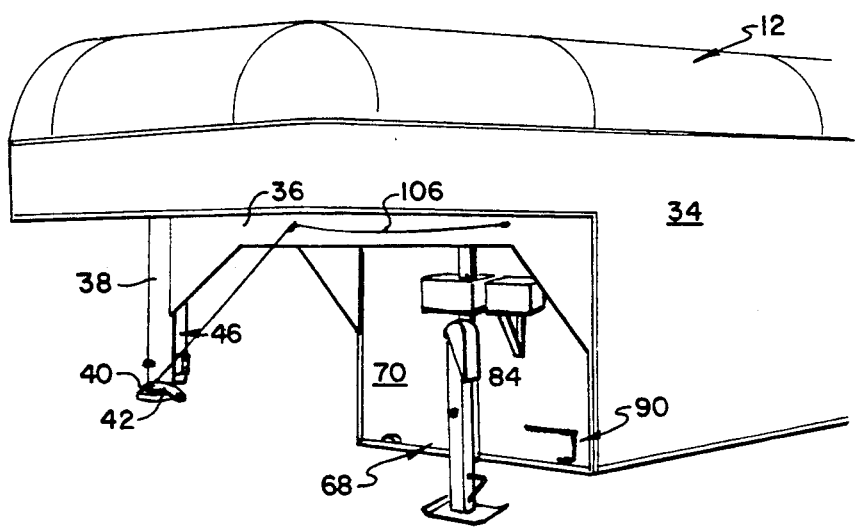
FIG. 2
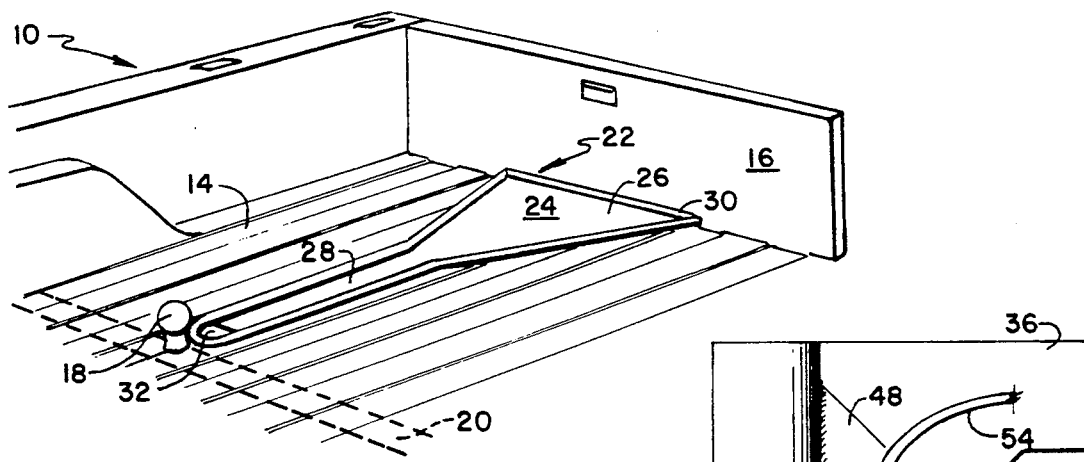
FIG. 3
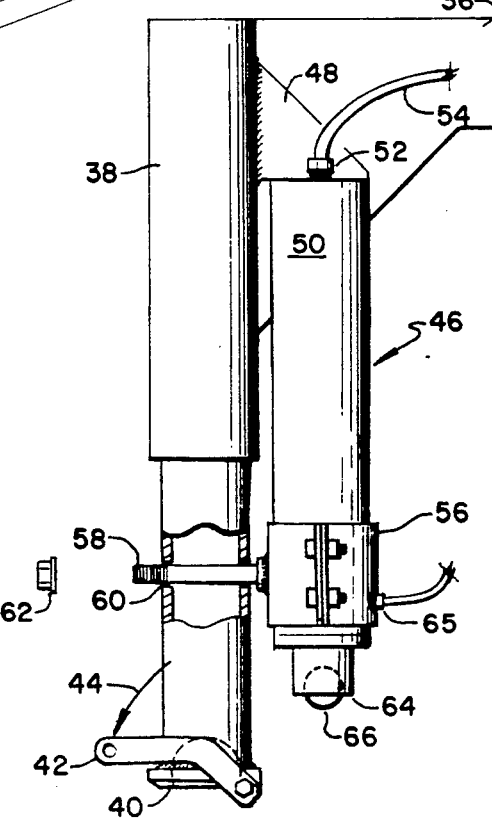
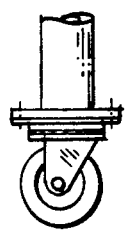
FIG. 6
FIG. 7

TRUCK-TRAILER CONNECTION WITH MEANS TO ASSIST COUPLING/UNCOUPLING

This invention relates to a technique for attaching a goose neck trailer to a hitch or ball in a truck bed.

Goose neck trailers and trailer hitches are old and well known in the art and are commonly used to connect relatively large trailers, such as stock trailers, travel trailers and the like, to relatively small trucks, such as pickup trucks. The standard goose neck trailer has a ball receiver on the end of the goose neck sized to couple with a ball secured in the middle of the pickup truck bed. To attach the trailer to the truck ball, the driver has to back the truck until the ball receiver on the goose neck is more-or-less vertically above the truck ball. The driver then gets out of the truck and lowers the trailer by cranking on the trailer stand handle so the ball receiver lowers onto the truck ball The trailer stand is elevated to an out-of-the-way position, the trailer lights and brakes are connected to the truck system and the trailer is ready to be towed. To detach the trailer, the trailer is driven to the desired location, the driver gets out of the truck and manually cranks the trailer stand down until the load of the trailer is borne by the trailer stand and the ball receiver vertically clears the truck ball.

Anyone who has jacked a trailer up on a hot summer day will testify that it is no easy chore. The larger the trailer, the more manual effort is required to couple or uncouple the trailer from a towing vehicle. Many people are physically unable to wind up the trailer stand handle on ordinary sized stock trailers or travel trailers. As will be more fully apparent hereinafter, one of the features of this invention is that most of the manual effort required to couple or uncouple a goose neck trailer from a towing truck is performed by a power assist system.

Proposals exist in the prior art to provide guide rails in a truck bed to allow a goose neck ball receiver to be guided toward the truck ball in response to backing the truck toward the trailer, as shown in U.S. Pat. Nos. 3,837,675 and 4,183,548. The disclosure of a caster wheel and guide mechanism to position a trailer ball receiver adjacent a truck ball is shown in U.S. Pat. No. 3,084,953. Other disclosures of interest are found in U.S. Pat. Nos. 3,941,407 and 4,168,847.

This invention relates to a technique for coupling and uncoupling a truck and a trailer requiring a minimum of manual effort on the part of the driver. The truck is provided with guide rails in the bed to direct a low friction member, such as a caster wheel, toward a position to locate the ball receiver immediately above the truck ball. A force applying mechanism, preferably an extendible hydraulic motor or ram, is extended to transfer the weight of the trailer to the truck, allowing the truck stand to be elevated and stowed. The hydraulic ram is then retracted to place the truck ball in the trailer ball receiver. To uncouple the trailer, the hydraulic ram is extended to lift the trailer ball receiver off the truck ball, the trailer stand is lowered to a position to accept the weight of the trailer and the hydraulic ram is retracted to transfer the trailer load to the stand.

In summary, this invention is a trailer comprising a wheeled body having a goose neck at a front end thereof providing a first member of a ball coupler; a trailer stand, on the body, movable from a first position elevating the front trailer end to a second stowed position allowing the goose neck to move downwardly; and means for transferring weight of the body between the trailer stand and a truck including a force applier, on the goose neck, having a low friction member on one end thereof and means for moving the low friction member substantially vertically between a lowered position in engagement with the truck and an upper position out of engagement with the truck.

One object of this invention is to provide a technique for coupling and uncoupling a goose neck trailer from a truck requiring a minimum of physical exertion.

Another object of this invention is to provide a goose neck trailer with means to facilitate coupling of the trailer to a towing truck.

A further object of this invention is to provide an improved coupling arrangement for a goose neck trailer.

Other objects and advantages of this invention will become more fully apparent as this description proceeds, reference being made to the accompanying drawings and appended claims.

IN THE DRAWINGS:

FIG. 1 is a partial isometric view of a trailer of this invention in the process of coupling or uncoupling with a truck;

FIG. 2 is a partial isometric view of a truck bed illustrating a more-or-less conventional truck ball in combination with a guide rail of this invention;

FIG. 3 is a side elevational view of the goose neck end of the trailer of FIG. 1;

FIG. 6 is an enlarged side view of a caster wheel; and

FIG. 7 is an enlarged side view of a low friction member.

Figure 4:
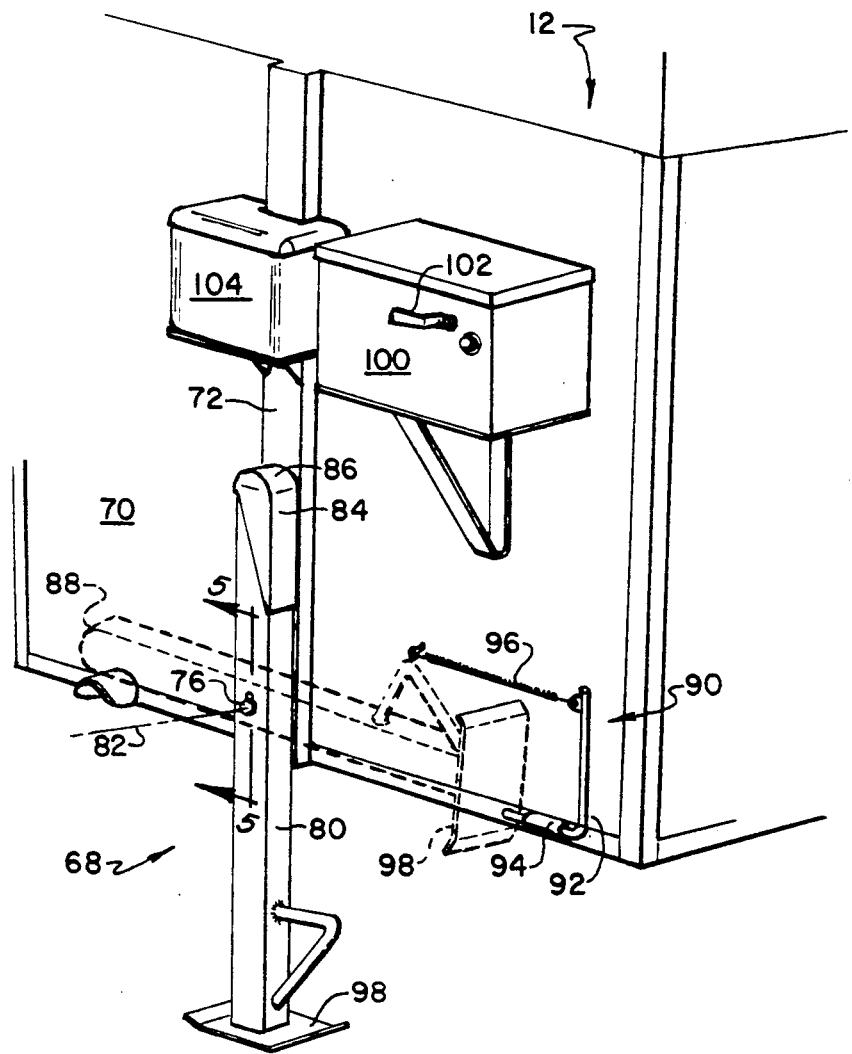
FIG. 4 is a partial isometric view of the trailer of FIG. 1 illustrating a trailer stand and hydraulic system components.
Figure 5:
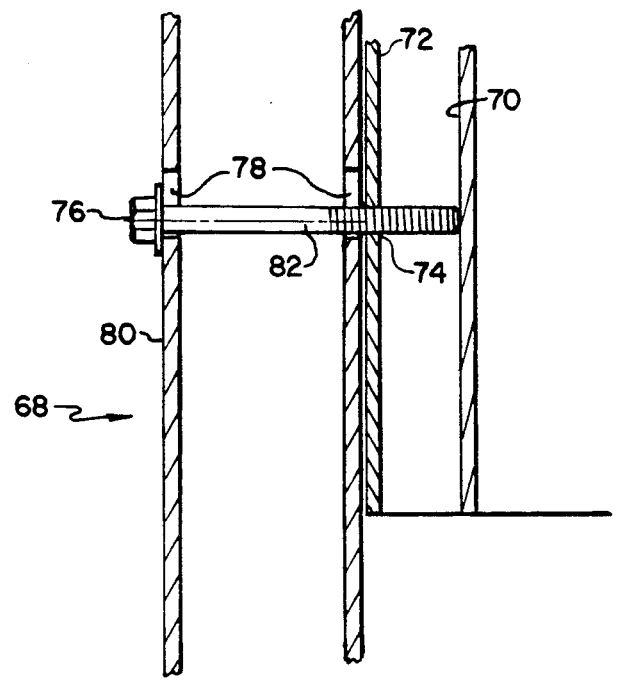
FIG. 5 is an enlarged cross-sectional view of the trailer stand of FIG. 4, taken substantially along line 5—5 thereof as viewed in the direction indicated by the arrows.

Referring to FIGS. 1-3, there is illustrated a truck 10 equipped to tow a trailer 12. The truck 10 is typically a pickup truck having a bed 14 and tailgate 16. A trailer ball 18 is secured to the bed 14 above the rear truck axle 20. A guide mechanism 22 is positioned in the truck bed 14 to guide the trailer 12 toward a coupling position relative to the ball 18.

The guide mechanism 22 comprises a plate 24 having a triangular section 26 and a relatively narrow section 28 merging with the small end of the triangular section. The triangular section 26 includes a wide end adjacent the tailgate 16 and a narrow end merging with the narrow section 28. A guide rail 30 is welded or otherwise secured to the plate 24 around the periphery thereof and extends beyond the end of the narrow section 28 to a location immediately adjacent the ball 18 to define a caster wheel receptacle 32 for purposes more fully apparent hereinafter.

The trailer 12 comprises a wheeled trailer body 34 having a forward extending goose neck structure 36 terminating in a vertical post or column 38 having a ball receiver 40 on the lower end thereof. The ball receiver 40 may be of any suitable type and is illustrated as a model GN24 Gooseneck Trailer Coupler available from Fulton Manufacturing Corporation of Milwaukee, Wisconsin, reference being made to an Owners Manual and Parts List, form #F1811-00, Rev. A, dated 12/1/82. The ball receiver 40 cooperates with the ball 16 to provide the mating components of a ball coupling. Historically, the ball 16 faces upwardly and the ball receiver 40 faces downwardly. The receiver 40 includes a lever 42 biased by a spring (not shown) in the direction shown by the arrow 44 into a latching position for captivating the ball 16.

A linear hydraulic motor or ram 46 is connected to the post 38 at a location adjacent the receiver 40 and preferably immediately behind it. To this end, a gusset 48 extends away form the post 38 and is welded to the cylinder 50 of the ram 46 at a location away from a hydraulic fitting 52 and hose 54. On the bottom of the cylinder 50 is a clamp 56 having a bolt 58 extending through an opening 60 in the post 38. A nut and washer arrangement 62 secures the clamp 56 and thus the cylinder 50 vertically to the post 38. The piston 64 of the ram 50 includes a low friction member on the lower end thereof. As illustrated, the member comprises a ball 66 captivated in the end of the piston 64 but may comprise a conventional caster wheel (FIG. 6) or a round member coated with a low friction plastic material (FIG. 7). In the retracted position of the piston 64, the ball 66 is somewhat above the bottom of the ball receiver 40 as shown in FIG. 2. In the extended position of the piston 64, the ball 66 is below the bottom of the ball receiver 40 to transfer the load of the trailer 12 between the pickup bed 14 and a trailer stand 68. As will be pointed out more fully hereinafter, hydraulic fluid is delivered to the fitting 52 to extend the piston 64. The piston 64 is retracted in any suitable fashion, as by an internal or external spring (not shown) or by hydraulic fluid delivered through a fitting 65 which extends through an opening in the clamp 56.

The trailer stand 68 is mounted on the front wall 70 of the trailer 12 and includes a reinforcing channel or support 72 welded to the trailer wall 70. The channel 72 provides an interiorally threaded passage 74 receiving a long bolt 76 passing through a vertically elongate slot 78 provided in a square tubing section 80 comprising the support leg of the trailer stand 68. The bolt 76 is sufficiently long that it bottoms out against the trailer wall 70 before clamping the leg 80 to the channel 72. When the load of the trailer 12 is supported on the truck 10, the bolt 76 is in the upper end of the slot 78 and leg 80 swings about an axis 82 of the bolt 76. When the load of the trailer 12 is transferred to the leg 80, the trailer 12 moves downwardly to position the bolt 76 in the bottom of the slot 78 and the leg 80 moves toward a leg end receiver 84.

A leg end receiver 84 is welded to the channel 72 and includes a generally cylindrical end 86 spaced beyond the end of the leg 80 when the bolt 76 is in the upper end of the slot 78. Thus, the leg 80 is free to pivot from a horizontal stowed position shown in dotted lines in FIG. 4 to a vertical position. When the leg 80 is in the vertical position and the load of the trailer 12 transferred to the trailer stand 68, the leg 80 moves upwardly as allowed by the slot 78 so the upper leg end enters the receiver 84 and is supported by the receiver 84 rather than the bolt 76. Thus, in the load supporting position of the trailer stand 68, the load is borne by the receiver 84 and channel 72 rather than the bolt 76. With the curved upper end 88 of the leg 80 in the cylindrical receiver end 86 and the load of the trailer supported on the stand 68, the leg 80 cannot pivot out of load supporting relation with the receiver 84 and the trailer stand 68 is surprisingly sturdy.

As shown in FIG. 4, the stand 68 is retained in the horizontal stowage position by a latch 90 comprising a pin 92 mounted for movement in a sleeve 94 and biased by a spring 96 toward engagement with an opening in the foot 98.

A hydraulic circuit is provided to deliver pressurized hydraulic fluid to and from the ram 46. To this end, there is provided a pump (not shown) inside a receptacle 100 mounted on the trailer wall 70. A switch 102 completes a circuit to an adjacent battery 104 or other source of power to deliver hydraulic fluid toward the ram 46. In the case of a double acting ram 46, reversing the switch 102 reverses fluid flow.

Operation of the device of this invention should now be apparent. To couple the trailer 12 to the truck 10, the trailer 12 is supported on the ground by the trailer stand 68 so the goose neck 36 is off the ground a sufficient distance to allow the post 38 and receiver 40 to pass through the open tailgate 16 of the truck 10. The driver backs the truck 10 toward the post 38 until the ram 46 is vertically above some portion of the guide mechanism 22. The driver exits the truck and manipulates the switch handle 102 to extend the piston 64 until the ball 66 engages the plate 24 and transfers the load of the trailer 12 to the bed 14 of the truck 10. The driver then stows the trailer stand 68 merely by swinging it in a counterclockwise direction until it is secured by the latch 90. The driver then backs the truck 10 slowly toward the trailer 12. The ball 66 rolls along the plate 24 and is guided by the rails 30 until the ball 66 drops into the receptacle 32 thereby placing the ball receiver 40 immediately above the truck ball 16. The driver then manipulates the switch 102 to retract the piston 64 thereby latching the ball receiver 40 on the ball 16 and transferring the load of the trailer 12 to the truck 10.

It is even simpler to uncouple the trailer 12 from the truck 10. The driver drives the truck to the desired trailer location. The driver moves the switch 102 to extend the piston 64 while pulling on the cable 106 which rotates the lever in the direction opposite the arrow 44 thereby unlatching the receiver 40 from the ball 16. The piston 46 advances until the ball 66 engages the receptacle 32 and raises the receiver 40 above the truck ball 16. The driver releases the cable 106 and manipulates the latch 90 to drop the trailer leg 80 to a vertical position. The leg 80 rotates to a position under the receiver 84. The driver then manipulates the switch 102 to withdraw hydraulic fluid from the ram 46 which transfers the load of the trailer 12 to the leg 80 causing the leg 80 to move upwardly as allowed by the slot 78 to enter the receiver 84. The driver then puts the tailgate 16 down and slowly drives away from the trailer 12.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A trailer comprising
   a wheeled body having a goose neck at a front end thereof providing means for transmitting a horizontal towing force from a towing vehicle to the trailer, the transmitting means comprising a first mating element on the front end of the goose neck for mating, in a load transferred relation, with a second mating member on the towing vehicle;

a trailer stand, on the body, movable from a first position elevating the front end of the body to a second stowed position allowing the goose neck to move downwardly; and means for elevating the front end of the body and transferring weight of the body between the trailer stand and the towing vehicle, including a motor, on the goose neck, having an extensible member providing a low friction member, separate from the first mating member, on one end thereof mounted for substantially vertical movement into engagement with the towing vehicle.

2. The trailer of claim 1 wherein the motor is positioned on the goose neck for vertical movement between an upper and a lower position, the low friction member in the upper position being above the first mating member.

3. The trailer of claim 1 wherein the motor is positioned on the goose neck for vertical movement between an upper and a lower position, the low friction member in the lower position being below the first mating member.

4. The trailer of claim 1 wherein the motor comprises a linear hydraulic motor having a first member secured to the goose neck and a second member extendible from the first member, the low friction member being connected to the second motor member.

5. The trailer of claim 1 wherein the first mating member comprises a trailer ball receiver.

6. The trailer of claim 1 further comprising a towing vehicle having the second mating element thereon and means on the towing vehicle for guiding the first mating element toward the second mating element for coupling engagement of the first and second mating elements, the motor being mounted on the goose neck for engaging the low friction member with the guiding means on the towing vehicle.

7. A trailer comprising
a wheeled trailer body having a goose neck at a front end thereof providing a first element of a trailer coupler;
a trailer stand, on the body, movable from a first position elevating the front end of the body to a second stowed position allowing the goose neck to move downwardly, the trailer stand comprises
a leg having a vertical slot therein having upper and lower slot ends;
a pin, rigid on the trailer body, in the slot mounting the leg for pivotal movement in an arc about an axis intersecting the upper slot end between a transverse stowed position allowing the goose neck to move downwardly and a first vertical position; and
means comprising a trailer stand receiver on the body at a location above the pin for receiving the trailer stand leg and preventing movement thereof;
the trailer stand leg being moveable, relative to the trailer body in response to the transfer of load to the leg, at the first vertical position to a second position abutting the trailer stand receiver; and means for elevating the front trailer end relative to a towing vehicle and transferring weight of the body between the trailer stand and the towing vehicle including a motor, on the goose neck, having an extensible member providing a low friction member, separate from the first element of the trailer coupler, on one end thereof mounted for substantially vertical movement into engagement with the towing vehicle.

8. A method of uncoupling a trailer from a towing truck wherein a vertical load of the trailer is carried by a truck-trailer hitch coupling, comprising
unhitching the hitch coupling,
moving an extensible support, against the truck, relative to the hitch coupling and thereby elevating the trailer hitch coupling vertically to a position clear of the truck hitch coupling and transferring the load of the trailer from the hitch coupling to the truck independent of the hitch coupling;
lowering a trailer stand on the trailer from a stowed position to a vertical load supporting position;
transferring the load of the trailer from the truck to the trailer stand; and then
driving the truck away from the trailer.

9. The method of claim 8 wherein the second mentioned transferring step comprises maintaining the trailer hitch coupling vertically clear of the truck hitch coupling.

10. The method of claim 8 wherein the elevating step and the first transferring step occur simultaneously.

11. The method of claim 8 wherein the support is moved against the truck at a location spaced from the hitch coupling.

12. A trailer comprising
a wheeled trailer body having a goose neck at a front end thereof providing a first member of a trailer coupler;
a trailer stand, on the body, movable from a first position elevating the front trailer end to a second stowed position allowing the goose neck to move downwardly; and
means for elevating the front trailer end relative to a towing vehicle and transferring weight of the trailer body between the trailer stand and the towing vehicle, including
a linear motor having a first member on the goose neck and a second member extensible from the first member providing a rollable member on one end thereof mounted for substantially vertical movement into engagement with the towing vehicle.

13. The trailer of claim 12 wherein the rollable member comprises a wheel.

14. The trailer of claim 12 further comprising a towing vehicle having the second mating element thereon and means on the towing vehicle for guiding the first mating element toward the second mating element for coupling engagement of the first and second mating elements, the motor being mounted on the goose neck for engaging the low friction member with the guiding means on the towing vehicle.

* * * * *